United States Patent [19]

Green et al.

[11] 3,740,479

[45] June 19, 1973

[54] IMPROVEMENTS IN OR RELATING TO JUNCTORS

[75] Inventors: William Harry Francis Green; John Brian Terry, both of Essex, England

[73] Assignee: The Marconi Company Limited, London, England

[22] Filed: Mar. 20, 1972

[21] Appl. No.: 236,273

Related U.S. Application Data

[63] Continuation of Ser. No. 26,731, April 18, 1970.

[52] U.S. Cl. .......................... 179/15 AQ, 179/15 A

[51] Int. Cl. .............................................. H04j 3/16

[58] Field of Search .................... 179/15 A, 15 AQ, 179/15 AT, 15 BS

[56] References Cited

UNITED STATES PATENTS 3,573,381 4/1971 Marcus ......................... 179/15 AQ

*Primary Examiner*—Ralph D. Blakeslee

*Attorney*—Baldwin, Wight, Diller & Brown

[57] ABSTRACT

A junctor for use in a time division multiplex telephone system comprising a plurality of stores equal in number to the number of time slots in one frame period, means for routing intelligence signal samples sampled during particular time slots into respective ones of said stores, means for controlling said stores such that said samples are stored for predetermined periods, means for routing each of said samples out of the respective store at the end of the respective predetermined period as another intelligence signal sample sampled during another particular time slot is routed into said store.

3 Claims, 3 Drawing Figures

Figures 1, 2:
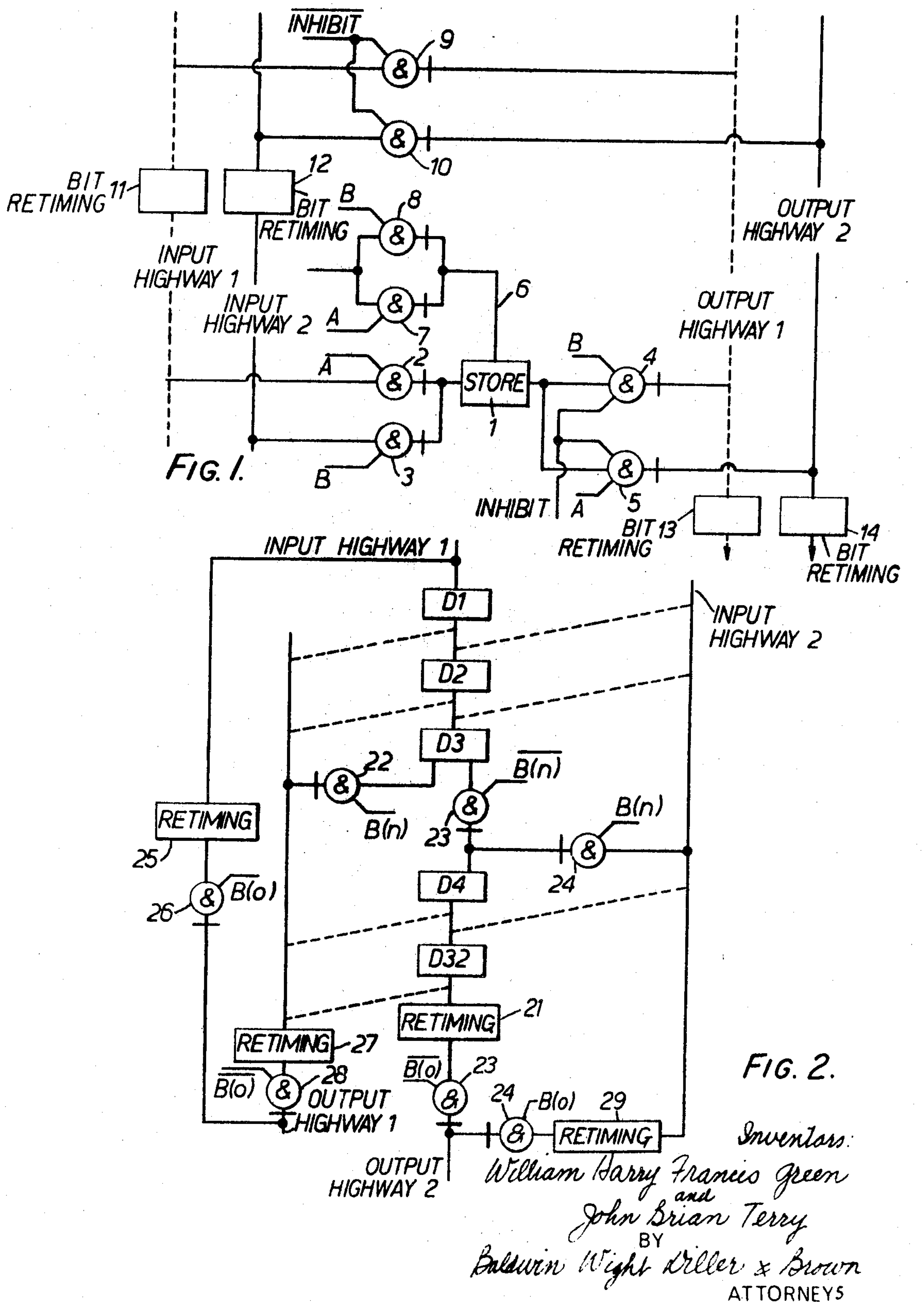

Inventors:
William Harry Francis Green
and
John Brian Terry
BY
Baldwin Wight Diller & Brown
ATTORNEYS Inventors:
William Harry Francis Green
and
John Brian Terry
BY
Baldwin Wight Diller & Brown
ATTORNEYS

IMPROVEMENTS IN OR RELATING TO JUNCTORS

This is a continuation of application Ser. No. 26,731, filed Apr. 8, 1970.

This invention relates to junctors of the kind commonly used in time division multiplex telephone systems. In this kind of telephone system the intelligence signal from a subscriber is repetitively sampled during an allocated time slot at time intervals equal to the frame period of the exchange. It is common for a particular intelligence signal to utilise only one thirty-second of a frame period, thus permitting the concurrent transmission of 32 different two-way calls. Junctors perform the function of time slot changing with a time division multiplex exchange enabling a subscriber allocated to a particular time slot to be connected to a subscriber on any other time slot. To perform this function it is necessary for a junctor to store a particular sampled intelligence signal for part of a frame period, and to transmit the sampled signal during the correct time slot.

Junctors capable of performing this function which are known to the Applicant have required two separate storage devices; one store for each way of a two-way call, and have required comparatively complex control signalling arrangements to achieve satisfactory operation. It is an object of this invention to provide an improved junctor.

According to this invention a junctor for use in a time division multiplex telephone system comprises a plurality of stores equal in number to the number of time slots in one frame period, means for routing intelligence signal samples sampled during particular time slots into respective ones of said stores, means for controlling said stores such that said samples are stored for predetermined periods, means for routing each of said samples out of the respective store at the end of the respective predetermined period as another intelligence signal sample sampled during another particular time slot is routed into said store.

Usually means are provided bypassing said stores for any samples relating to one way of a two-way call of which the samples relating to the other way of the same two-way call are samples sampled during the same time slot as the samples relating to said one way of the same two-way call.

In one embodiment of the invention the arrangement is such that normally the sample routed out of a store at the end of a predetermined period is a sample relating to one way of a two-way call of which the sample routed into the same store at the same time relates to the second way of the same two-way call.

In said one embodiment said plurality of stores are connected in parallel between a pair of input highways and a pair of output highways, for any given two-way call one of said input highways and one of said output highways being provided to carry samples relating to one way of said two-way call and the other of said input highways and the other of said output highways being provided to carry samples relating to the other way of said two-way call, the input terminal of each store being connected to both input highways via gates and the output terminal of each store being connected to both output highways via further gates, all of said gates being controlled in operation to obtain the routing of samples into and out of said stores.

In another embodiment the arrangement is such that normally the sample routed out of a store at the end of a predetermined period is a sample relating to one way of one two-way call whilst the sample routed into the same store at the same time is a sample relating to one way of a different two-way call.

In said other embodiment said plurality of stores are connected in series between one of a pair of input highways and one of a pair of output highways, for any given two-way call one of said input highways and one of said output highways being provided to carry samples relating to one way of said two-way call and the other of said input highways and the other of said output highways being provided to carry samples relating to the other way of said two-way call, a controllable switch arrangement being connected between each store and the next whereby signals stored in each store may be applied to the next or to the other of said pair of input highways or to the other of said pair of output highways.

Preferably said controllable switch arrangement is controlled such that a sample relating to one way of a two-way call is routed from said one of said pair of input highways into and through one or more of the serially connected stores to the other one of said pair of output highways whilst at the same time a sample relating to the other way of the same two-way call is routed into and through the remaining stores to the said one of said pair of output highways.

Figure 3:
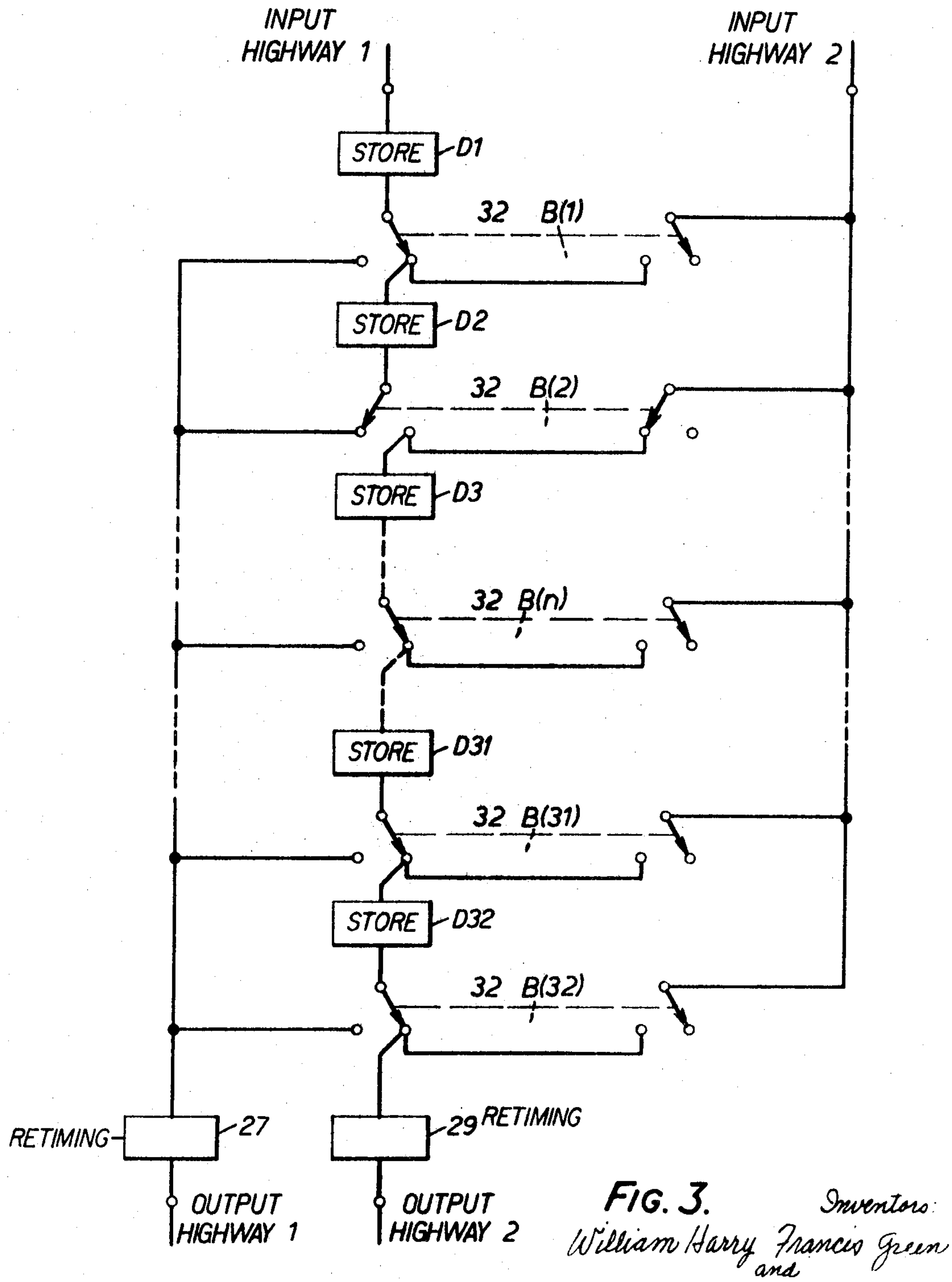

The invention is illustrated in, and further described by way of example with reference to, the accompanying drawings, in which FIG. 1, FIG. 2 and FIG. 3 show particular embodiments of junctors in accordance with this invention.

FIG. 1 shows a junctor in which two telephone subscribers, say A and B, who are each allocated to a particular and possibly different time slot within a time division multiplex telephone exchange may be connected to one another. For the purpose of describing FIG. 1 it is assumed that subscriber A is calling subscriber B, and that subscriber A's conversation to subscriber B is routed into the junctor on input highway 1 shown therein during subscriber A's time slot (hereinafter called time slot A) and out of the junctor on output highway 2 during subscriber B's time slot (hereinafter called time slot B).

Conversely subscriber B's conversation to subscriber A is routed into the junctor on input highway 2 during time slot B, and out on output highway 2 during time slot A. The junctor includes 32 10-bit storage registers of which only one of these registers 1 is shown. Storage registers are well known, and a 10-bit storage register may conveniently comprise one half of a dual eight-bit storage register type Fairchild M.S.T. 9328 and a two-bit storage register type Texas Instruments SN7474. An input end of the register 1 is connected to the output terminal of dual input AND gates 2 and 3. One input of AND gate 2 is connected to input highway 1; the other input being connected to a route processor (not shown) which provides a signal to this input during time slot A. Similarly one input of AND gate 3 is connected to input highway 2; the other input of which receives a signal from a route processor during time slot B. The output end of the register 1 is connected to one input of each of triple input AND gates 4 and 5. One each of the remaining inputs of AND gates 4 and 5 are connected together and to the route processor from which may be supplied an inhibit signal. The third input of each of AND gates 4 and 5 are separately connected to the route processor and receive signals during B time slot and A time slot respectively. Also connected to the register 1, is a clock line. The clock line 6 is routed through dual-input AND gates 7 and 8 whose outputs and one input of each are connected together respectively. The remaining inputs are each separately connected to the route processor and receive signals during time slots A and B respectively.

Connected directly between input highway 1 and output highway 1 is one input and the output of a dual-input AND gate 9 respectively. A further dual-input AND gate 10 is similarly connected between input highway 2 and output highway 2. The second inputs of AND gates 9 and 10 are connected together and to the route processor to receive the complement of the inhibit signals applied to AND gates 4 and 5.

The circuit as described, and which includes references 1 to 10, carries the conversation between subscribers A and B. Since in practice it is usual to provide 32 time slots in a frame period, the complete circuit is duplicated 32 times, each circuit being connected in a similar manner to the input and output highways and to the route processor in parallel with the illustrated junctor.

Bit retiming devices 11, 12, 13 and 14 are provided as shown. They are not essential so far as an understanding of the operation of the junctor is required, but merely serve to bring bits into correct synchronisation to compensate for any undesired delays introduced by the circuit components in the system. Each retiming device may conveniently comprise a single-bit storage register, such as one half of a two-bit register type Texas Instruments SN 7474, since it would be arranged that any undesired delay which is present is of less than one-bit duration.

The circuit operates as follows. During time slot A, subscriber A's sampled conversation appears in a 10-bit digital form on input highway 1 and is clocked into register 1 (initially assumed empty) by means of clock pulses applied to clock line 6; both AND gates 2 and 7 being opened during this time slot by signals from the route processor (not shown). On termination of time slot A both AND gates 2 and 7 close, and subscriber A's sampled conversation remains stored in the register. During time slot B, subscriber B's sampled conversation appears in a 10-bit digital form on input highway 2, and at the same time AND gates 3, 4 and 8 are opened by signals from the route processor. Thus subscriber B's sampled conversation is clocked into register 1 at the same time as subscriber A's conversation is clocked out of register 1 onto output highway 1 via AND gate 4. On termination of time slot B, gates 3, 4 and 8 close, and subscriber B's conversation remains stored in register 1 until time slot A next occurs, when the process is repeated. It will now be clear that subscriber A's conversation is transferred into the junctor during time slot A, where it is stored until time slot B occurs whereupon it is transferred to the appropriate output highway to be routed to subscriber B, and similarly for subscriber B's conversation. The register 1 is thus utilised for the whole of the frame period (equal to a particular time slot repetition period). The circuit as described so far operates satisfactorily provided that time slot A is not the same time slot as time slot B. In this case, were it not prevented, both subscriber A's and B's conversation would be transferred simultaneously into register 1 and all intelligible information would be lost. Thus provision is made within the route processor (not shown) that if time slot A and time slot B are one and the same, AND gates 4 and 5 are inhibited (i.e., prevented from opening) by means of an inhibit signal applied thereto for the duration of this time slot. Instead, the conversations are routed directly from the input highways to the output highways via AND gates 9 and 10 which are opened for the duration of this time slot, by means of a signal also provided by the route processor.

FIG. 2 shows a serial delay junctor, in contrast to the junctor shown in FIG. 1 which is a parallel delay junctor. As with the parallel delay junctor, the serial delay junctor possesses storage registers which are fully utilised for the whole of a frame period, and has the further advantage that each register requires only a single control signal from the route processor. This will be apparent from the description which follows. The junctor array includes thirtytwo 10-bit registers D1 ..... D32 each serially connected as shown by the broken line therebetween, which represents an interposed switching network each identical to the switching network illustrated by way of example between registers D3 and D4. Each register D1 to D32 is similar to the register 1 of FIG. 1. Each switching network comprises three dual-input AND gates 22, 23 and 24, one input of each being controlled by a route processor (not shown). As will be apparent subsequently the realisation of the switching network using the particular logic to elements illustrated is not essential; the function of each switching network being merely equivalent to that produced by a gauged pair of double-pole switches. Input highway 1 is connected to the input of the first register D1, and also to output highway 1 via a retiming device 25 and a dual-input AND gate 26. Input highway 2 is connected to one input of each of the 32 AND gates 24, and output highway 2 is connected to the 32nd switching network at the junction of the outputs from AND gates 23 and 24. A retiming device 21 is present between register D32 and its associated AND gate 32. Retiming devices 21,25, 27 and 29 are similar to the retiming devices of FIG. 1. The outputs of all 32 AND gates 22 are fed via a retiming device 27 and a dual-input AND gate 28 to output highway 1.

As in the junctor referred to in FIG. 1 it is assumed that the sampled conversation from subscriber A is routed onto input highway 1 during time slot A, and that similarly the sampled conversation from subscriber B is routed onto input highway 2 during time slot B. As before, the sampled conversation is in a 10-bit digital form which will be clocked into register D1. In the present embodiment the contents of the registers D1 ..... D32 are continuously clocked through the registers serially by means of clock pulses (not shown). The particular route through the junctor taken by any particular sample conversation will depend on the state of the switching network comprising AND gates 22, 23 and 24. These AND gates are controlled by a route processor (not shown) which provides an output signal shown symbolically as B(n) to the nth switching network, during time slot B which is representative of the time slot interval *n* between time slots A and B. It is arranged that subscriber A's conversation will pass through *n* registers and subscriber B's conversation will pass through 32-*n* registers.

Thus in operation subscriber A's sampled conversation is applied to and completely fills, register D1 during time slot A. During successive time slots this conversation (which is in the form of a 10-bit digital word) is clocked automatically through successive registers until, *n* time slots later, time slot B occurs, during which subscriber B's conversation is received on input highway 2. Simultaneously for the duration of time slot B the route processor activates the nth switching circuit comprising the AND gates 22, 23 and 24. By this means AND gates 22 and 24 are opened by signal B(n), and AND gate 23 closed by signal B(n). This serves to route the conversation from subscriber A via an AND gate 22 and the retiming device 27 and AND gate 28 (which is normally open) to output highway 1. Subscriber B's conversation is similarly routed via the open AND gate 24 into the $n + 1$ th register, which is clocked through the remaining registers and through the normally open gate to output highway 2. It is thus clear that subscriber A's conversation enters the junctor during time slot A, and leaves during time slot B after passing through *n* delay registers where n is the time slot difference between time slots A and B as previously described. Similarly subscriber B's conversation enters the junctor during time slot B, and leaves during time slot A after being delayed by 32-n time slots.

If both time slots A and B are coincident, the route processor generates switching signal B(o) which indicates a zero time slot interval between time slot A and time slot B. This signal is applied to AND gates 26 and 24 and its complement B(o) to AND gates 23 and 28. By this means subscriber A's conversation is routed directly from input highway 1 via retiming device 25 through the now open AND gate 26 to output highway 1. Similarly subscriber B's conversation is routed from input highway 2 via retiming device 29 through the now open AND gate 24 to output highway 2. No other conversation reaches the output highways during this time slot since AND gates 23 and 28 are closed.

It is possible to dispense with the zero time delay circuits by using the circuit shown in FIG. 3. In this figure the switching networks 22, 23 and 24 have been replaced with gauged double-pole switches 32, which are operated as before by signals B(n) derived from a route processor (not shown). The operation of the circuit is identical with that of FIG. 2, except when time slot A is coincident with time slot B. In this circuit this is treated as a time slot difference of 32 time slots, i.e., one complete frame period. The route processor provides a control signal B(32) which ensures that conversation present on input highway 1 passes through all 32 registers D1 ..... D32, and is routed by the 32nd switch via retiming device 27 onto output highway 1. Conversely any conversation present on input highway 2 bypasses all registers and is routed directly via retiming device 29 onto output highway 2 with effectively a zero time delay.

We claim:

1. A junctor for use in a time division multiplex telephone system of the kind having clock input means for establishing successive information frames each consisting of a plurality *n* of time slots, said junctor including:

a pair of input highways and a pair of output highways, for any given two way conversation between a pair of subscribers one of said input highways and one of said output highways being provided to carry samples relating to one way of the said two way conversation and the other of said input highways and the other of said output highways being provided to carry samples relating to the other way of said two way conversation;

a plurality *n* of stores connected in series between the said one of the pair of input highways and said other of the pair of output highways;

and controllable gating means connected between each store and the next for routing samples stored in each store to the next store or to the said one of said pair of output highways.

2. A junctor as claimed in claim 1 and wherein said controllable gating circuit is controlled such that a sample relating to one way of a two way conversation is routed from said one of said pair of input highways into and through one or more of the serially connected stores to the said one of said pair of output highways whilst at the same time a sample relating to the other way of the same two way conversation is routed into and through the remaining stores to the said other of said pair of output highways.

3. A junctor for use in a time division multiplex telephone system of the type having clock input means for establishing successive information frames each consisting of a plurality *n* of time slots; a plurality n of input means for receiving voice signal samples from a number *n* of subscribers in sequence during said n time slots; and a plurality n of output means for transmitting voice signal samples to said subscribers in sequence during said *n* time slots, the improvement wherein said junctor comprises:

a plurality n of stores serially disposed between one of said input means associated with a first subscriber whose voice signals are sampled during a time slot A and one of said output means associated with said first subscriber so as to receive voice signal samples from a second subscriber whose voice signals are sampled during a time slot B; and gating means for connecting said one input means to said further output means serially through some of said stores during time slots A-B and thereafter for connecting said further input means to said one output means serially through the remainder of said stores to establish two-way conversation between said subscribers during different time slots of each frame.

* * * * *